US011434687B2

(12) United States Patent
Grein (10) Patent No.: US 11,434,687 B2
(45) Date of Patent: Sep. 6, 2022

(54) PROFILED SAFETY STRIP AND DOOR COMPRISING A PROFILED SAFETY STRIP (71) Applicant: Gummi-Welz GmbH & Co. KG Gummi-Kunststofftechnik, Neu-Ulm (DE)

(72) Inventor: Horst Grein, Neu-Ulm (DE)

(73) Assignee: Gummi-Welz GmbH & Co. KG Gummi-Kunststofftechnik, Neu-Ulm (DE)

( * ) Notice: Subject to any disclaimer, the term of this patent is extended or adjusted under 35 U.S.C. 154(b) by 238 days.

(21) Appl. No.: 16/617,735

(22) PCT Filed: May 18, 2018

(86) PCT No.: PCT/EP2018/063142
§ 371 (c)(1),
(2) Date: Nov. 27, 2019

(87) PCT Pub. No.: WO2018/219694
PCT Pub. Date: Dec. 6, 2018

(65) Prior Publication Data
US 2020/0190897 A1 Jun. 18, 2020

(30) Foreign Application Priority Data
Jun. 1, 2017 (DE) .................... 10 2017 112 133.1

(51) Int. Cl.
*E06B 7/23* (2006.01)
*F21S 4/20* (2016.01)
(Continued)

(52) U.S. Cl.
CPC .......... *E06B 7/2312* (2013.01); *B60J 10/235* (2016.02); *B60J 10/248* (2016.02); *B60J 10/86* (2016.02);
(Continued)

(58) Field of Classification Search
None
See application file for complete search history.

(56) References Cited

U.S. PATENT DOCUMENTS 5,333,227 A * 7/1994 Ishiharada ........... G02B 6/0001
385/100
5,347,759 A 9/1994 Kobayashi et al.
(Continued)

FOREIGN PATENT DOCUMENTS

| CN | 102806832 A | 12/2012 | |
| DE | 19908902 A1 * | 9/2000 | ............... E06B 7/28 |

(Continued)

OTHER PUBLICATIONS

Mary Shen, How to build LED Strip Lights into Neon Silicon Tube to instead Neon LED Flex, XP54982054A, YouTube, URL:<youtube.com/watch?v=Fcyu579XMpk>, retrieved from the Internet Mar. 9, 2017.

(Continued)

*Primary Examiner* — Marcus Menezes
(74) *Attorney, Agent, or Firm* — Vorys, Sater, Seymour and Pease LLP (57) ABSTRACT

The aim of the invention is to provide a rubber profiled safety strip or an elastic profiled safety strip which can carry out a signaling function. To this end a profiled safety strip (10) is provided for a door (15) of a transport means, wherein the profiled safety strip (10) contains an opaque elastic main part (11) in which at least one receiving region (17, 18) is formed, and in the at least one receiving region (17, 18) an insert strip (12, 31) is disposed, which contains at least one light source (13, 32) and is made of an elastic material that is at least partly transparent.

20 Claims, 10 Drawing Sheets

(51) Int. Cl.
*B60J 10/235* (2016.01)
*B60J 10/248* (2016.01)
*B60J 10/86* (2016.01)
*B60Q 1/32* (2006.01)
*E06B 7/28* (2006.01)
*F21V 3/04* (2018.01)
*E06B 9/172* (2006.01)
*F21Y 115/10* (2016.01)
*F21W 106/00* (2018.01)

(52) U.S. Cl.
CPC ............ *B60Q 1/323* (2013.01); *E06B 7/2314* (2013.01); *E06B 7/28* (2013.01); *E06B 9/172* (2013.01); *F21S 4/20* (2016.01); *F21V 3/04* (2013.01); *F21W 2106/00* (2018.01); *F21Y 2115/10* (2016.08)

(56) References Cited

U.S. PATENT DOCUMENTS

| | | | | |
|---|---|---|---|---|
| 5,433,031 | A * | 7/1995 | Dailey | B60J 10/40 49/27 |
| 6,129,360 | A | 10/2000 | Walker et al. | |
| 7,226,112 | B2 * | 6/2007 | Ward | B60J 5/101 296/146.8 |
| 9,469,244 | B2 * | 10/2016 | Salter | H05B 47/115 |
| 9,604,568 | B1 * | 3/2017 | Salter | B60Q 1/22 |
| 10,137,831 | B1 * | 11/2018 | Salter | B60Q 3/62 |
| 10,703,263 | B2 * | 7/2020 | Salter | B60J 10/84 |
| 2002/0126498 | A1 * | 9/2002 | Atkinson | B60J 10/00 362/501 |
| 2002/0152686 | A1 * | 10/2002 | Whitehead | B60J 10/80 49/475.1 |
| 2005/0073852 | A1 * | 4/2005 | Ward | B60Q 1/305 362/501 |
| 2010/0118557 | A1 * | 5/2010 | Ortwein | B63B 45/00 362/477 |
| 2011/0016796 | A1 * | 1/2011 | Foster | E06B 5/164 49/477.1 |
| 2011/0235307 | A1 * | 9/2011 | Hernandez | A47F 3/04 362/92 |
| 2012/0013454 | A1 * | 1/2012 | Krugh, IV | B60Q 1/50 340/433 |
| 2016/0016506 | A1 * | 1/2016 | Collins | B60J 10/20 362/464 |
| 2016/0144699 | A1 * | 5/2016 | Salles | B60J 10/40 49/483.1 |
| 2016/0176336 | A1 * | 6/2016 | Hoek | B60Q 1/323 362/549 |
| 2017/0050503 | A1 * | 2/2017 | Roth | B60J 10/40 |
| 2017/0305247 | A1 * | 10/2017 | Salles | B61D 19/00 |
| 2019/0255923 | A1 * | 8/2019 | Salles | B60J 10/40 |
| 2019/0315272 | A1 * | 10/2019 | Salter | B60Q 3/78 |

FOREIGN PATENT DOCUMENTS

| | | | | |
|---|---|---|---|---|
| DE | 102005032629 A1 * | 3/2006 | | E06B 7/20 |
| DE | 10 2012 105593 A1 | 2/2013 | | |
| DE | 102012105593 A1 | 2/2013 | | |
| EP | 3409557 A1 * | 12/2018 | | B60Q 3/78 |
| FR | 3081782 A1 * | 12/2019 | | B60Q 1/323 |
| GN | 102806832 A | 12/2012 | | |
| KR | 20100083238 A * | 7/2010 | | |
| KR | 10-2014-0042249 A | 4/2014 | | |
| WO | WO-0042456 A1 * | 7/2000 | | G02B 6/001 |
| WO | WO-02085656 A1 * | 10/2002 | | B60Q 3/78 |
| WO | 2011/138292 A1 | 11/2011 | | |
| WO | 2011138292 A1 | 11/2011 | | |
| WO | WO-2020020601 A1 * | 1/2020 | | B60J 10/75 |

OTHER PUBLICATIONS

Office Action dated Jul. 9, 2021 from Eurasian Patent Application No. 201992682/31 to Gummi-Welz Gmbh & Co. Kg Gummi-Kunststofftechnik-Schaumstoffe.

* cited by examiner

PROFILED SAFETY STRIP AND DOOR COMPRISING A PROFILED SAFETY STRIP

FIELD OF THE INVENTION

The invention relates to a profiled safety strip for at least one door of means of transport. It also relates to a door with a profiled safety strip. In particular, the invention relates to a rubber profiled safety strip having a predetermined flexibility or elasticity.

BACKGROUND OF THE INVENTION

For the purposes of the invention, the term "means of transport" is to be understood as referring in particular to commercial vehicles, elevators, aircraft, or cable car gondolas. The profiled safety strip according to the invention is preferably used on doors or movable elements of means of transport for the purpose of signaling a movement or generally a state of the door or of the movable element to persons using the means of transport.

Until now, signal lamps in means of transport have been integrated in aluminum or steel door profiles or arranged on the side walls. This requires elaborate manufacturing engineering and may affect the rigidity of the aluminum or steel door profiles. Moreover, the signal lamps in such door profiles or on the side walls of the means of transport must be supplied with voltage.

Rubber profiled strips conventionally have the task of providing a seal between a door and a frame or another door. Therefore, rubber profiled strips are attached to the edges of the aluminum or steel door profiles.

Due to the increased demands that are placed on means of transport, and due to heightened safety regulations, rubber profiled strips have not only a sealing function as a result of their elasticity, but also one or more signaling functions. To wit, many rubber profiled strips have contact elements integrated into them which indicate a contact with an object or user and interrupt or stop a movement of the door or of the movable element as appropriate. Moreover, rubber profiled strips are known which have a light grid arrangement with which a space around the moving door is monitored contactlessly through transmission and/or reception of non-visible light. Based on changes in the light received, the presence of an object or a person within the range of motion of the door can be detected and appropriate controls initiated.

In the automotive sector, door profiles or trims are known which contain light elements whose purpose it is to illuminate the floor or entry area, for example, thus facilitating entry into the vehicle in the dark.

SUMMARY OF THE INVENTION

The object of the invention is to provide a rubber profiled safety strip or an elastic profile safety strip that performs a signaling function. The profiled safety strip according to the invention must be sufficiently robust for use in means of transport and simple and inexpensive to manufacture, the signaling function being preferably configured so as to be upgradable or interchangeable.

The invention is based on the idea of enhancing the functionality of elastic profiled strips, which are referred to as rubber profiles, in order to offer alternatives to manufacturers of means of transport for the implementation of safety devices. Integration of additional security elements into the profiled strip is facilitated by the sealing characteristic that is inherent to each elastic profiled strip, since, particularly in the case of means of transport, applications take place in a moist environment with large temperature fluctuations and also with mechanical stresses that require adequate sealing, particularly of electrical elements. This is especially necessary for a long durability of the safety devices.

The object is achieved by features of the independent claims. Advantageous embodiments can be found in the dependent claims.

The object is achieved, in particular, by a profiled safety strip for a door for means of transport, with the profiled safety strip containing an opaque elastic base body in which at least one receiving region is formed, and with an insert strip being arranged in the at least one receiving region that contains at least one light source and is made of an elastic material that is at least partially transparent.

In a preferred embodiment, a first receiving region is embodied as a cavity that is open at least to one outer side of the profiled safety strip, a first insert strip made of an at least partially transparent material being inserted into the open cavity and containing the light source. The first receiving region is embodied as a form-fitting region.

Preferably, a second receiving region is embodied as a form-fitting region, it being possible for a second insert strip to be inserted or arranged in the form-fitting region that has a fastening portion corresponding to the form-fitting region.

It is proposed that the open cavity be facing an interior space or the outside of the means of transport and/or that the form-fitting region be embodied on a front face of the base body that faces another door or a stop.

In one exemplary embodiment, the open cavity has at least one recess that forms a form-fitting connection with at least one corresponding protuberance of the insert strip.

A reflective region is preferably formed on a surface adjoining the insert strip that deflects a light emitted by the light source away from or out of the base body.

The profiled safety strip can have an electrical contact strip. This increases the functionality of the profiled safety strip.

The contact strip can output a contact signal that is used to control the light source.

The contact strip can be arranged in region of the profiled safety strip that contacts a stop or in the region of the profiled safety strip that contacts another door. This makes it easy to detect a mechanical contact with the other door or with a stop or object.

The contact strip is preferably arranged in an enclosed cavity which, upon elastic deformation, causes the contact signal to be outputted by the contact strip.

Preferably, the light source includes LEDs that output light in one or more colors in the visible wavelength range. LEDs have low power consumption and are easy to integrate. Moreover, LEDs are available that can emit light in many different colors, which enables the type and manner of the signaling to be well adapted to the conditions of use.

Preferably, the light source can output a light of a first color in one or both insert strips when the door is closed and/or a light of another color when the door is opened.

Depending on the direction in which the door moves, the LEDs in the insert strip can be switched on sequentially in at least one direction.

The light source can be preferably configured as an elongate flat strip with a plurality of LEDs.

The elongate ribbon can be inserted with its longitudinal orientation into the open cavity, and the plurality of LEDs can be disposed on one or both side surfaces of the ribbon.

Preferably, the at least partially transparent material of the insert strip forms an optical diffuser. The profiled safety strip can preferably have an enclosed cavity for receiving a light grid arrangement. This enables the functionality of the profiled safety strip to be further increased. In this case, the arrangement of the insert strip can be adapted to the arrangement of the cavity for receiving a light grid arrangement in the profiled safety strip. This prevents the light from the insert strips from influencing the function of the light grid arrangement.

The second insert strip can preferably also contain a light source and be arranged on a side of the profiled safety strip opposite the open cavity with the first insert strip. This arrangement enables signaling to occur on both sides of the profiled safety strip.

Preferably, the form-fitting connection is formed by means of a dovetail-shaped recess in the base body and a corresponding protuberance on the second insert strip or a dovetail-shaped protuberance on the base body and a corresponding recess on the second insert strip.

The second insert strip can further comprise one or more air chambers that are formed in a contact region of the second insert strip. This ensures reliable detection of a contact by the contact strip.

The second insert strip is preferably made of the same material as the first insert strip. This makes it more economical to manufacture the first and the second insert strips. The second insert strip can also be made of another material having a higher rigidity. This has the advantage that the second insert strip cannot bend so easily. In the case of the first insert strip, such bending does not occur because it is surrounded almost completely by the base body.

Preferably, the insert strip can have a passage that runs in the longitudinal direction of the profiled safety strip and into which the light source can be inserted, this passage being sealed in a watertight manner at its respective front face. That is, the profiled safety strip is preferably mounted over the entire height of the door. The one or two insert strips thus preferably also each extend from the lower edge of the door to the upper edge of the door. Alternatively, it is also possible to form one or both insert strips only in a certain region of the profiled safety strip. For example, the one or two insert strips could be mounted or used only in the region of the profiled safety strip that lies in people's direct field of vision. In other words, the insert strips could be mounted or inserted only in the central region of the profiled safety strip, and an upper and/or lower region of the profiled safety strip would then have no insert strip in these regions. It is also possible not to provide the insert strips with light sources in these passive regions and instead to use only the partially transparent insert strip, or the insert strip would be made of opaque material in this region. The insert strip would then contain a plurality of longitudinal portions, with one of the longitudinal portions containing light sources and at least one other longitudinal portion not containing any. It can therefore also be said that a plurality of insert strips are inserted into the cavity. The front faces of the insert strip—i.e., the portions of the insert strip that lie at the lower edge and the upper edge of the door, for example—are sealed, so that moisture cannot penetrate between the insert strip and the base body, nor can any moisture get between the insert strip and the light source.

In a preferred embodiment, clamping elements can be inserted between the first insert strip and the open cavity in order to fix the first insert strip in the cavity. This has the advantage that the insert strip has a simple shape without recesses or protuberances. The clamping elements are also called beads. The use of bracing elements makes it possible for the insert strip to be removed later from the base body, for example in order to replace it.

The first insert strip is preferably arranged between contact strip and a fastening region of the profiled safety strip on the door and/or outside a flexible contact region of the profiled safety strip. That is, the insert strip is arranged between the fastening region and the region of the profiled safety strip that is compressed when striking another door or a stop. In an arrangement of the profiled safety strip in a door profile, the insert strip is arranged between the fastening region and the front face of the profiled safety strip.

In an advantageous embodiment, the second insert strip is fastened to the base body in a form-fitting manner and projects therefrom.

It is proposed that the second insert strip have one or more air chambers and/or at least one at least partially transparent profile lip that form a flexible contact region of the profiled safety strip. This improves the identification of a contact by means of the contact strip.

The base body can preferably have at least one support wedge that supports the second insert strip from an inner side of the profiled safety strip, thereby preventing the second insert strip from kinking, particularly into a emission region of the light grid arrangement.

The second insert strip can emit light toward the front side of the profiled safety strip and to an outer side of the door.

The passage for receiving the light source in the second insert strip can run substantially parallel to the supporting surface of the supporting wedge, although a different orientation of the passage is possible—for example at right angles to the window and/or parallel to the passage of the first insert strip.

Rubber has preferred suitability as a material for the opaque elastic base body.

In a preferred embodiment, the insert strip encloses the at least one light source. This protects the light source from damage. In addition, the light source can be pre-installed or overmolded into the insert strip, and the insert strip with integrated light source can be used at another location in the profiled safety strip.

The profiled safety strip can have a first contact region and a second contact region, the first contact region being made of opaque material and the second contact region made of at least partially transparent material. Making the contact region of partially transparent material enables light emission to also take place in the contact region.

In a preferred embodiment, the first and/or second insert strip can also have an opaque and an at least partially transparent portion. That is, the insert strip is composed of two components. This opens up better possibilities for attaching the insert strip to the base body, since the partially transparent portion now need only be placed onto the opaque portion of the insert strip. The light source is preferably attached to the opaque portion, and the partially transparent portion can be arranged or mounted in the direction of emission in order to define a particular direction of the light emission.

Preferably, the first and/or second insert strip is transparent in an emission region and opaque in the fastening region.

The object is also achieved by a door with a profiled safety strip according to the invention.

The first and second insert strips preferably have the same shape. This reduces manufacturing costs.

Alternatively, the first and second insert strip can also have different shapes or contours. This enables various functions to be realized.

Preferably, the profiled safety strip is arranged in a movable door leaf and/or a fixed door portal. The one or more door leaves can perform translational and/or rotational movements.

It is preferred that the second insert strip be attached to the base body behind a glass of the door and extend along an inner side of the glass and protrude from the glass in the contact region of the profiled safety strip.

BRIEF DESCRIPTION OF THE DRAWINGS

FIG. 6a shows a perspective view of an opened door with profiled safety strips according to FIG. 4 from a second side;

FIG. 6b shows a perspective view of the closed door according to FIG. 6a;

DETAILED DESCRIPTION OF THE INVENTION

The invention will be described in greater detail below with reference to the individual figures.

Figure 1A:
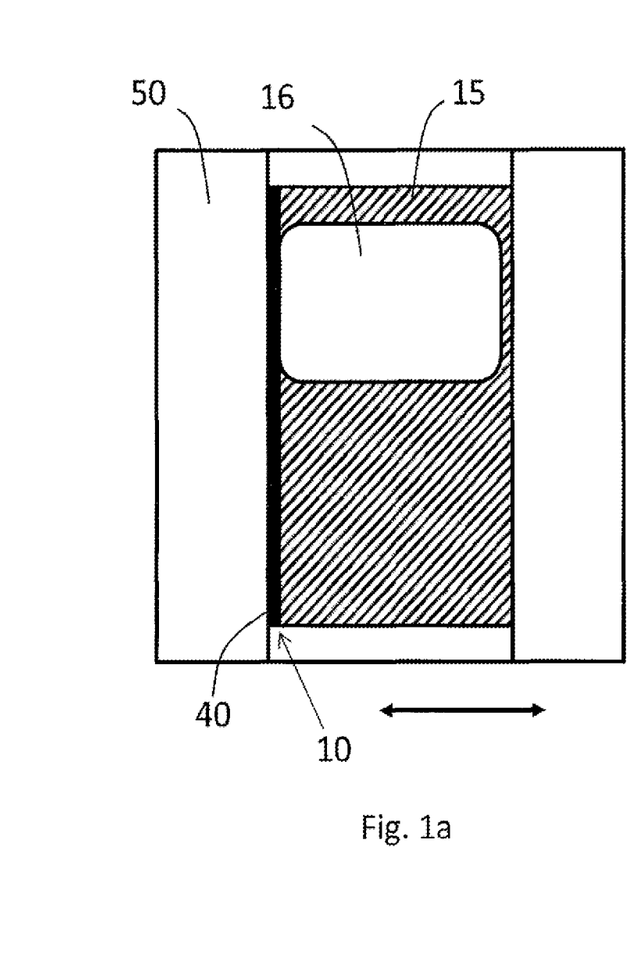
FIG. 1a shows a door of a means of transport with the profiled safety strip according to the invention.

FIG. 1a shows a schematic of a door 15 of a means of transport, such as a train, for example, this door 15 having a single-leaf design and working as a sliding door that runs against a stop 40 of a train, and the door having a profiled safety strip 10 according to the invention on its front face that is slightly compressed when the door 15 strikes against an aluminum/steel profile. The door 15 preferably has a glass pane or window pane 16.

Figure 1B:
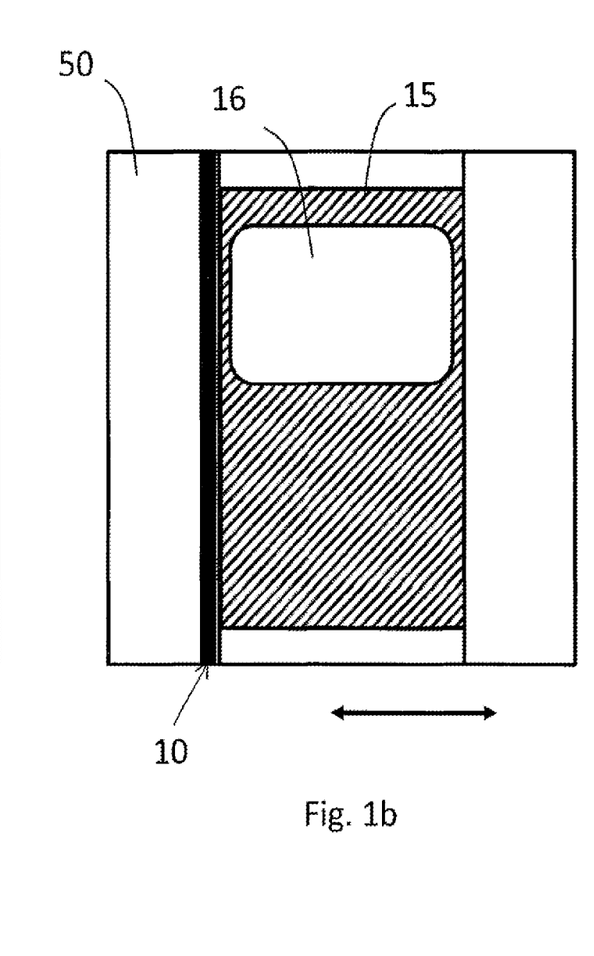
FIG. 1b shows a door of a means of transport with a profiled safety strip in the door portal.

FIG. 1b shows a schematic of a door 15 of a means of transport having a single-leaf design, the profiled safety strip 10 according to the invention being arranged in the door portal 50. In other words, in this alternative arrangement, the profiled safety strip is fastened in the door portal with a profile foot, and the moving door runs against the profiled safety strip 10 during a closing movement.

This has the advantage that, in the profiled safety strip according to the invention, and during installation thereof in the door portal, the bushings of the lines for the power supply of the light source 13 within the insert strip 12 need not be integrated into moving parts of the door, which enables simpler manufacturing and assembly to be achieved as well as more reliable operation of the profiled safety strip 10 according to the invention.

Figure 1C:
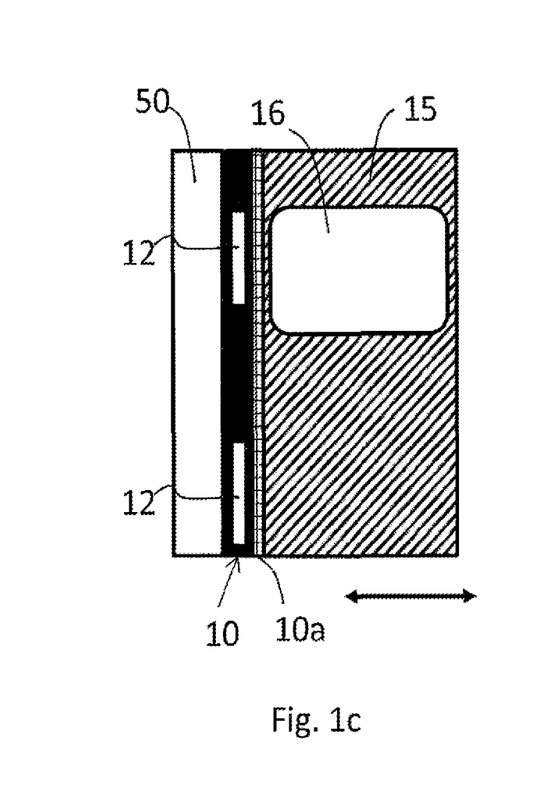
FIG. 1c shows a door of a means of transport and a profiled safety strip according to the invention on the door and on the door portal, preferably with an upper and lower insert strip in the profiled safety strip on the door portal.

FIG. 1c shows an arrangement similar to that of FIG. 1b. A profiled safety strip 10 is also attached to the door portal 50 here. The profiled safety strip 10 is thus not moved. In FIG. 1c, an upper and/or lower insert strip 12 with light source 13 are respectively provided which are arranged only in the head region and/or in the foot region. The movable door 15 according to FIG. 1c can also have a profiled safety strip 10a according to the invention, which, in a particular embodiment, can also have an insert strip 12 with light source 13. However, it is also possible in such a constellation for the profiled safety strip 10a on the door 15 without insert strip to be embodied with lighting means and for them to be made of a pure rubber profile which then comes to rest against the profiled safety strip 10 attached to the door portal 50 when the door 15 is closed.

Figure 2:
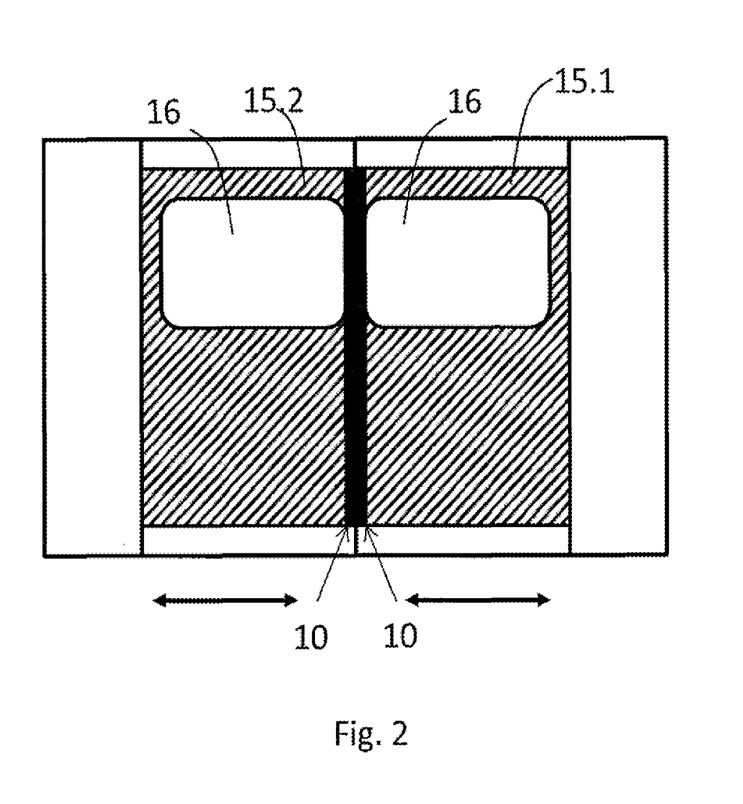
FIG. 2 shows a double door of a means of transport, each with the profiled safety strip according to the invention.

FIG. 2 shows a two-leaf door that is also installed in a train, for example. The two door elements 15.1 and 15.2 are embodied as sliding doors and run with their front faces against one another, so that the profiled safety strips of the invention 10 abut against each other.

It is not shown in the figures, but also possible, for the profiled safety strip 10 according to the invention to be arranged on a plug door, a swing door, a folding door, a swinging-sliding door, an inward-swinging door, or an outward-swinging door, etc., that runs either against a stationary door stop or against another leaf of a corresponding door.

Figure 3A:
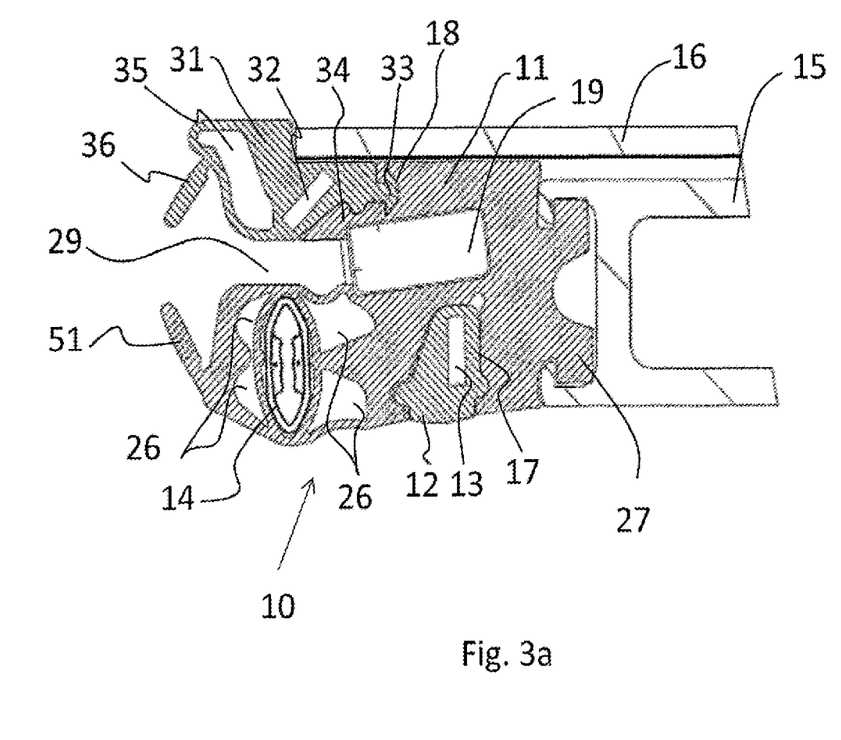
FIG. 3a shows a cross section of the profiled safety strip according to the invention according to a first embodiment.

FIG. 3a shows a sectional view of the inventive profiled safety strip 10 according to the first exemplary embodiment. The profiled safety strip 10 comprises a base body 11 that is fastened to the door 15, which is shown here only as an aluminum/steel door profile.

The base body 11 is preferably made of an opaque or light-impermeable material, preferably rubber. The base body 11 has a first contact region, which is shown at the bottom left in FIG. 3a and is formed by a plurality of thin webs and air chambers 26 formed by same. A cavity is arranged in this contact region in which a contact strip 14 is arranged. Next, a profiled rib 51 is arranged in this contact region that strikes against the stop 40 or against the oppositely situated door or the profiled safety strip thereof during a movement of the door.

In addition, the base body 11 has a receiving region that is embodied as an open cavity 17 and is directed downward in FIG. 3a. This receiving region or open cavity 17 serves the purpose of receiving the first insert strip 12. The open cavity 17 preferably projects more deeply into the base body 11 than its opening is wide. Moreover, the base body 11 has an additional cavity into which a light grid arrangement 19, not shown in detail, is inserted that radiates a non-visible light into a emission region 29 or receives light via same or through this emission region 29. Both the contact strip 14 and the light grid arrangement 19 are optional. That is, in the simplest case, the profiled safety strip 10 has no contact strip 14 and no light grid arrangement 19 or only one of these two things.

The base body 11 includes an additional receiving region 18 that is embodied here as a dovetail-shaped groove into which a dovetail-shaped protuberance 33 of the second insert strip 31 is inserted. The additional receiving region 18 is arranged on the opposing outer side of the profiled safety strip, so that the two receiving regions 17 and 18 are each arranged on one side of the profiled safety strip 10 and respectively display toward to an inner side and an outer side of the door when the profiled safety strip 10 is in the installed state. The additional receiving region 18 is shown in the upper portion of FIG. 3*a*.

Usually, the first insert strip 12 is directed toward the interior of the vehicle and the second insert strip 31, which is partially bounded by the window pane 16, is directed toward the exterior.

The base body 11 has, adjacent to the cavity for the light grid arrangement 19, a supporting wedge 34 which, on the one hand, delimits the emission region 29 for the light grid arrangement 19 and, on the other hand, supports the second insert strip 31 in order to prevent the second insert strip 31 from being bent in the direction of the emission region 29.

The profiled safety strip 10 according to FIG. 3*a* is bounded on an outer side by a window pane 16, meaning that one side of the base body 11 rests against the inner side of the window pane 16. The window pane 16 is preferably blackened in this region, so that the region of the profiled safety strip 10 behind the window pane 16 is not visible to the viewer.

The base body 11 also has a fastening portion 27 that is inserted into an aluminum or steel profile of the door 15.

A second contact region, which is formed by the second insert strip 31, is formed opposite the first contact region of the profiled safety strip 10. The second insert strip 31 is preferably made of transparent elastic material, preferably silicone.

In order to form the second contact region, the second insert strip 31 has a compressible air chamber 35 and a profile lip 36 protruding therefrom. Upon compression of this contact region through abutment of the profiled safety strip against another door or a stop profile, or upon contact with an obstacle, the profile lip 36 is pressed against the air chamber 35 and the air chamber 35 is compressed, so that a triggering of the contact strip 14 in the first or lower contact region becomes possible. This triggering of the contact strip 14 is preferably used to stop the closing of the door as a result of an unforeseen contact—a trapped person or a jammed object, for example—being reported.

The contact strip 14 preferably emits a contact signal when in contact with an object or obstacle. This contact signal can be used to control the light source. A controller (not shown) receives the contact signal and then outputs a power-on signal to the light sources in the insert strips. Depending on the condition or status of the means of transport, the controller can control the light output of the insert strips. When the doors are closed or opened as planned, the controller can instruct the insert strips to emit a red or green light. The outputting of the light during planned opening or closing can be preferably continuous. However, if the controller receives a signal of the contact strip 14 and/or of the light grid assembly 19 during the closing process that suggests contact with a person or obstacle, the controller can instruct the insert strips to emit a red or green light that is pulsed or lights up periodically. When a person enters the closing or movement space of the door without contact being detected by the light grid arrangement, a yellow light can be outputted in order to indicate the danger, for example. In other emergency situations, such as emergency braking or fire, a flashing light can also be emitted, in which case the passengers can be guided by the light of plurality of insert strips by being turned on by a central control in succession in order to signal a direction for evacuation.

The contact strip 14 can be arranged in region of the profiled safety strip 10 that contacts a stop or in the region of the profiled safety strip 10 that contacts another door. This makes it easy to detect a mechanical contact with the other door or with a stop or object.

The contact strip 14 is preferably arranged in an enclosed cavity which, upon elastic deformation, causes the contact signal to be outputted by the contact strip 14.

The first and second insert strips 12 and 31 are preferably made of the same material.

According to the invention, a provision is made that the profiled safety strip 10 contains at least one insert strip and that the at least one insert strip contains at least one light element. Preferably, this light element is enclosed or sealed by the insert strip. Due to the fact that the insert strip is elastic on the one hand and partly transparent on the other hand, the insert strip can function as a signal generator, i.e., as a light output. What is more, a secure sealing of the light element is made possible.

The material used for the at least one insert strip 12, 31 is designed to be at least partially transparent, so that the emitted light can be emitted from the insert strip by a light element 13, 32 contained in the insert strip 12, 31.

In the first insert strip 12, which is arranged on a first side of the base body 11 (in the lower region in FIG. 3), a light outlet is provided or even possible only on the first side of the profiled safety strip 10 on which the opening of the open cavity 17 is arranged.

That is, when the profiled safety strip 10 is in the installed state, the light emitted from the insert strip 12 is emitted only frontally to one side and, depending on the implementation of the profiled safety strip, to the inside or outside of the door, so that a person in the means of transport or a person entering the means of transport can recognize a light emitted by this insert strip.

The second insert strip 31, which is arranged partially behind the window pane 16, is hardly surrounded by the opaque material of the base body 11 and can thus emit light to at least three sides of the second insert strip 31. An emission of light substantially in the direction of the front face, i.e., in the direction of movement of the door, it thus possible. In addition, the light is also emitted through the transparent material of the second insert strip 31 to the second side of the door (usually the outer side) on which the window pane 16 is located.

The light source 13 in the first and/or second insert strip 12, 31 is preferably instantiated as LEDs that are applied to an elongate flat body, for example.

That is, the light emission of the light source 13 within the first insert strip 12 takes place to the side surfaces of the open cavity 17 and not directly to the open side of the cavity 17 or not directly to the emitting surface of the first insert strip 12. This has the advantage that the open cavity 17, which serves the purpose of receiving the first insert strip 12, can be made narrow and the elongate flat strip with the LEDs mounted thereon can be inserted into this open cavity 17 with the flat long side of the flat strip. The LEDs can be arranged on the elongate strip both on only one and on both opposing surfaces of the flat strip and thus emit light either to one side surface of the open cavity 17 or to both side surfaces of the open cavity 17, but without direct emission from the LEDs to the outside through the opening. The flat strip on which the LEDs are mounted on one or both sides preferably has dimensions of 8 mm×2.5 mm. That is, the strip is about 2.5 mm thick and about 8 mm wide. The longitudinal extension of the flat strip depends on the length of the insert strip. In most cases, the insert strip extends from an upper edge of the door to the lower edge of the door in which the profiled safety strip is installed. A section-wise extension or a section-wise installation of the insert strip into the profiled safety strip is also possible.

Alternatively, the light source 13 can also be used within the first insert strip 12 in such a way that the light output is oriented substantially directly in the direction of the opening of the cavity 17 in order to achieve maximum luminous efficacy.

The material of the first insert strip 12 as well as of the second insert strip 31 acts here as an optical diffuser, so that the material used enables light scattering and uniform emission of light to be achieved at the emitting surface of the first and second insert strip 12, 31. This prevents the user from being able to recognize the sequential arrangement of the light sources or LEDs on the elongate strip within the insert strip 12, 31. LEDs have very intense light emission, which, however, is scattered by the insert strip 12, 31 according to the invention in such a way that uniform, non-blinding emission of the light is made possible.

The addition of transparency-reducing particles to the silicone, which is preferably used as material for the insert strips, enables the intensity of the diffusion to be influenced. However, it may also be desirable in special applications for the light source to be recognized at selected points, so that no or hardly any transparency-reducing particles are then required.

Another alternative is to use a silicone that has an appropriate diffusion characteristic without adding further particles or substances during the manufacture of the insert strip.

It is also possible for flat strips with LEDs to be used that have less of a glaring effect. In other words, the diffusion function is already provided in this case by the LED or the flat strip.

Furthermore, a provision is made according to the invention that the first insert strip 12 is secured in the open cavity 17 in a form-fitting manner. On the one hand, this can be achieved by providing the insert strip 12 with protuberances 28 and recesses (not shown) and corresponding notches 23 and protuberances (not shown) in the base body 11.

In addition, or as an alternative, it is also possible for the insert strip to have smooth side surfaces and for the insert strip to be held in the open cavity 17 by clamping elements such as beads, for example (not shown).

In order to enhance the luminous efficacy, it is also possible to at least partially coat the inner side surfaces of the open cavity 17 or the corresponding outer surfaces of the insert strip 12 that bear against the inner side surfaces of the open cavity 17 with a reflective material in order to thus direct the light that is emitted to these side surfaces of the open cavity 17 in the direction of the emitting surface 25 of the insert strip 12. A partial arrangement of reflective materials, preferably on the outside of the second insert strip 31, is also possible for the second insert strip 31 in order to direct the light emission to the desired emitting surfaces and to prevent the emission of light to non-visible regions of the profiled safety strip.

In order to further facilitate insertion of the first insert strip 12, the base body 11 can have additional recesses 21 that enable the base body 11 to be bent open and thus enable the insert strip 12 to be inserted more easily. It is also possible for the insert strip 12 to be glued in the open cavity 17.

The second insert strip 31 has a passage in which a second light source 32 is embedded. This second light source 32 is arranged in the second insert strip 31 such that it is only partially overlapped by the window pane 16 when viewed from above from the side of the window pane 16 and, moreover, is arranged obliquely to the sliding direction/ direction of movement of the door 15. However, the position of the light source 32 can also be aligned parallel to the inner side surface of the air chamber 35. This enables the highest possible luminous efficacy to be achieved or for the emission characteristic to be adjusted. As with the first insert strip 12, the luminous efficacy can be enhanced by at least partially coating regions of the adjacent surfaces of the base body 11 with a reflective material in order to enhance the emission of the light. Alternatively, the boundary surfaces of the second insert strip 31 that rest against the base body 11 or parts thereof can be coated with reflective material.

Figure 3B:
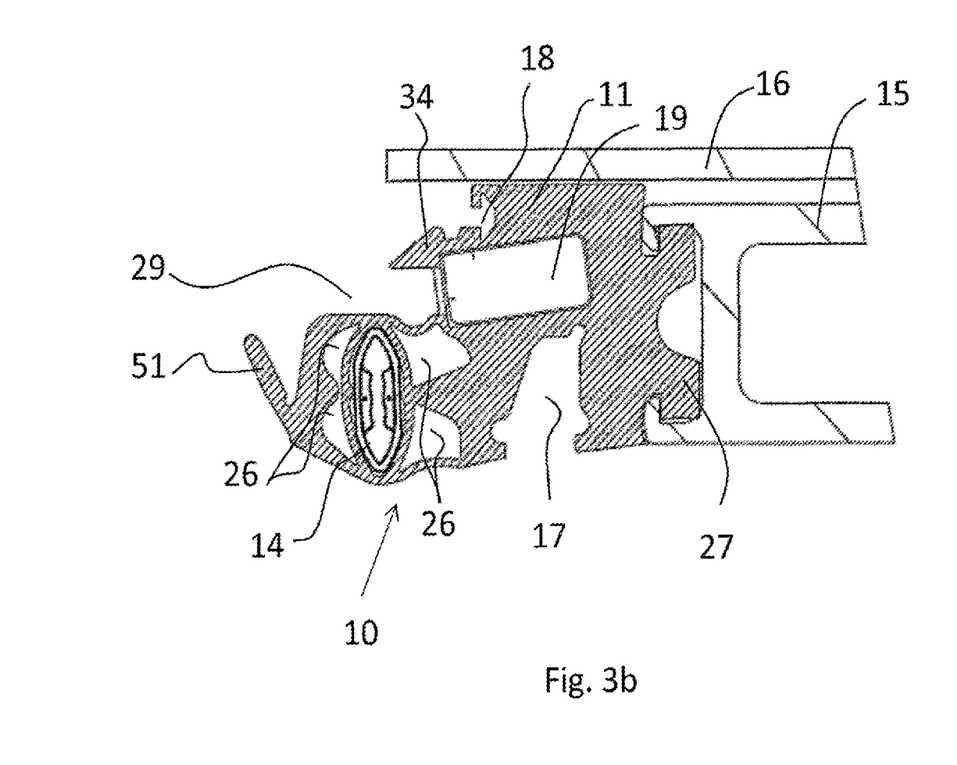
FIG. 3b shows a cross section of the profiled safety strip according to the invention according to the first embodiment without insert strip.
Figure 4:
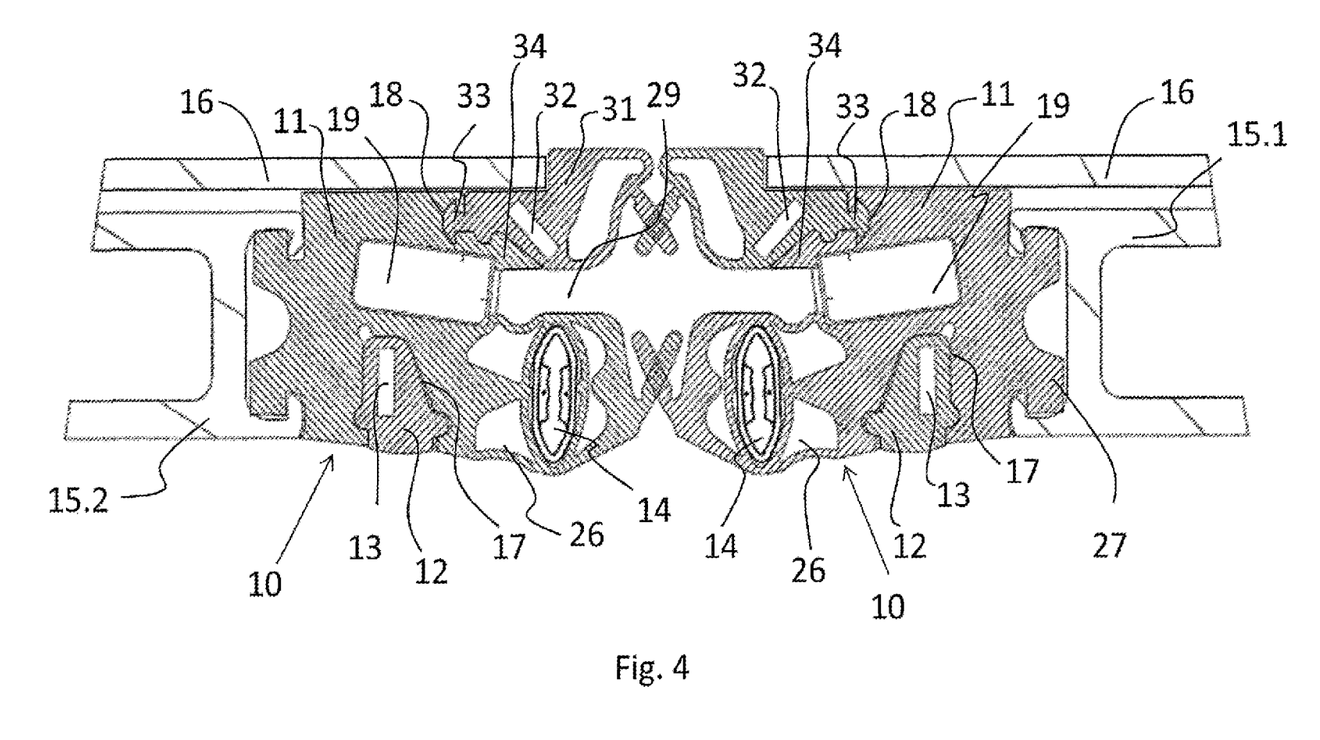
FIG. 4 shows a cross section of profiled safety strips according to the invention, which are integrated into a double door according to FIG. 2.

FIG. 4 shows a double door according to FIG. 2 in which both sliding doors 15.1 and 15.2 have a profiled safety strip 10 according to the invention. The profiled safety strip 10 is almost identical to the profiled safety strip in FIG. 3a or 3b. The only difference is that the sliding doors 15.1 and 15.2 run counter to one another and not against a stop 40 as is the case with a single-leaf sliding door according to FIG. 1. Since the components are substantially the same as in FIGS. 3a and 3b, a detailed description of FIG. 4 will be omitted.

Figure 5A:
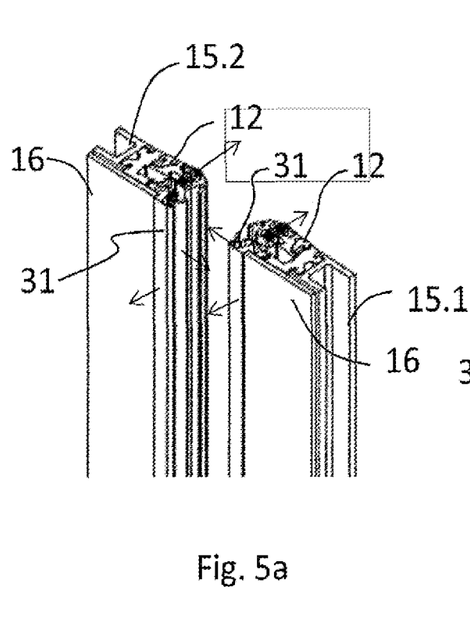
FIG. 5a shows a perspective view of an opened door with profiled safety strips according to FIG. 4 from a first side.

FIG. 5a shows a perspective illustration according to FIG. 4 with a view of the door profiles from the side of the window panes 16. The second insert strips 31 can thus be seen when the cutout of the door profile is seen from above. First insert strips 12 that emit light in this direction can be seen on the rear side. The direction of emission is indicated by arrows.

Figure 5B:
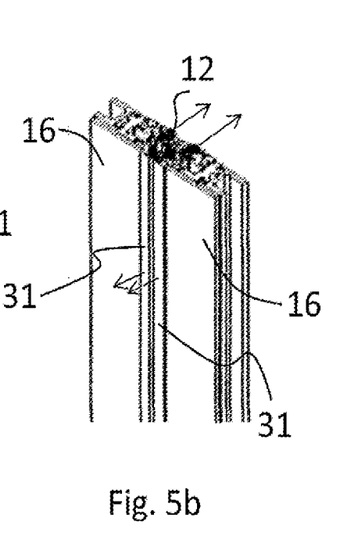
FIG. 5b shows a perspective view of the closed door with profiled safety strips according to FIG. 4 from the first side.

FIG. 5b shows a view of the cutout of the door profile with closed door leaves according to FIG. 5a. Here, too, it can be seen that the second insert strips 31 are aligned toward the front and emit light in the direction of the window panes 16. The first insert strips 12 in the view according to FIG. 5b are directed toward the rear and emit light toward the rear.

Figure 5C:
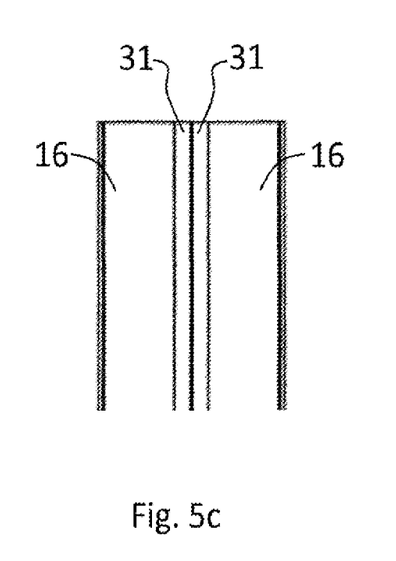
FIG. 5c shows a cutout of a closed double door with profiled safety strips from the first side.

Depending on the manner in which the door is installed in the means of transport, the first insert strips 12 lie on the inside of the means of transport or, in the case of another method of installation, on the outside of the means of transport. The second insert strips 31 lie on the outside or on the inside of the means of transport. FIG. 5c shows a plan view of a cutout of a two-leaf closed door in which the second insert strips 31 of the profiled safety strips 10 emit light toward the front side.

Figures 6A, 6B:
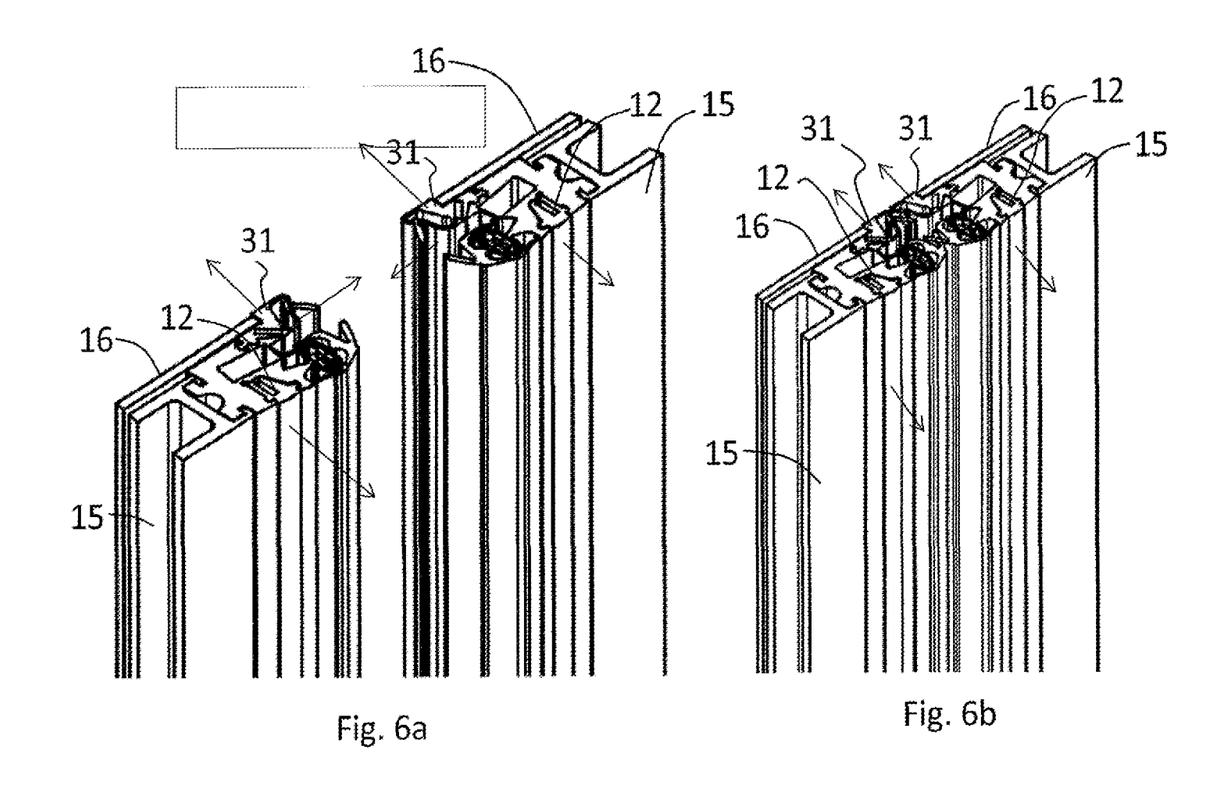

FIG. 6a shows door profiles of a two-leaf door in a view from the inside. In this view, the first insert strips 12 are inserted into the profiled safety strip 10 such that they emit light toward the front side of the door profiles according to FIG. 6a, i.e., into the interior of the means of transport. The second insert strips 31 emit their light in the direction of the front side of the two door profiles and in the direction of the rear side of the door profiles, i.e., to the outside of the means of transport. FIG. 6b shows detail of the door profiles according to FIG. 6a in the closed state.

Figure 7:
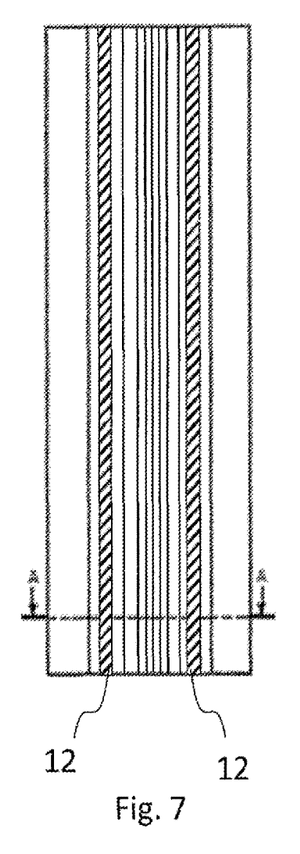
FIG. 7 shows a view of a closed door with profiled safety strips according to FIG. 4 from the second side.
Figures 8, 9:
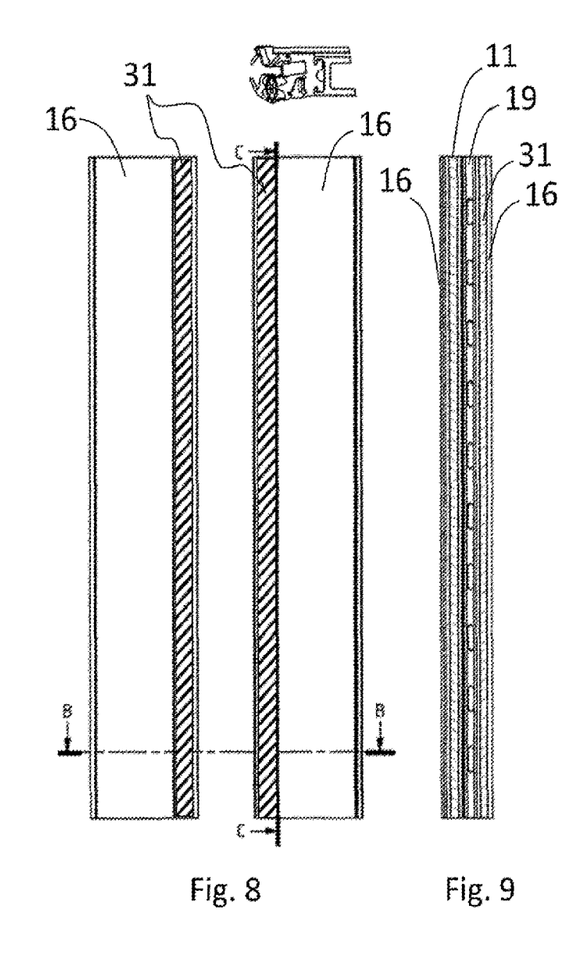
FIG. 8 shows a view of an opened door with profiled safety strips according to FIG. 4 from the first side.
FIG. 9 shows a sectional view along C-C according to FIG. 8.

FIG. 7 shows a cutout according to FIG. 6b as a plan view. FIG. 8 shows a cutout of the door profiles according to FIG. 5a in the opened state, and FIG. 9 shows a sectional view along the line C-C.

It can be seen in FIG. 9 that the emission region 29 (see FIG. 3a, 3b, or 4) exposes a space that is needed for openings in the light grid assembly 19 in order for infrared light to be emitted from and received by the light grid array 19. The second insert strip 31 is shown in the portion to the right. The first insert strip 12 is not shown in FIG. 9.

Figure 10:
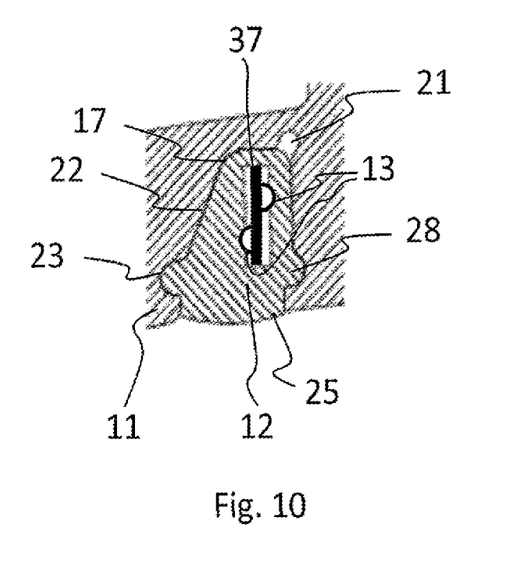
FIG. 10 shows an enlarged cutout of the first insert strip with light source of the profiled safety strip according to the invention.
Figure 11:
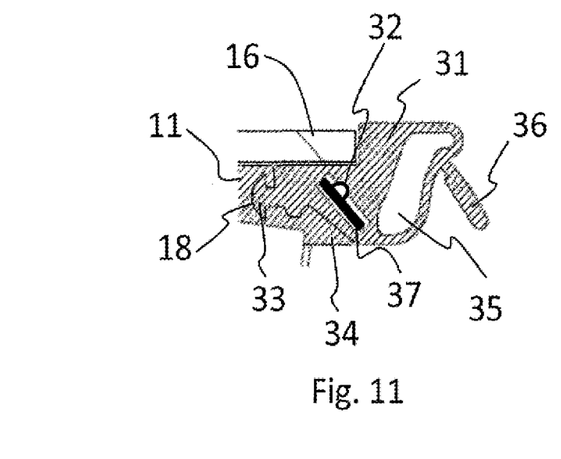
FIG. 11 shows an enlarged cutout of the second insert strip with light source of the profiled safety strip according to the invention.

FIG. 10 shows an enlarged representation of the first insert strip 12. FIG. 11 shows an enlarged representation of the second insert strip 31. The first insert strip 12 is inserted in the base body 11, the base body 11 being made of an opaque elastic material, preferably rubber. The first insert strip 12 is made of at least partially transparent material, preferably silicone. The first insert strip 12 comprises a light source 13 comprising LEDs. These are arranged on a flat strip 37. In a particular embodiment, the LEDs can be inserted into the passage in the insert strip 12 on an elongate flat strip 37. The light of the light source 13 is preferably emitted to the right and left sides as shown in FIG. 10—i.e., in the direction of the base body 11 and not in the direction of the emitting surface 25 of the first insert strip. This has the advantage that the open cavity 17 can be made relatively narrow and thus does not entail any substantial compromises in terms of the stability of the profiled safety strip. In order to achieve a high level of luminous efficacy in spite of everything, the side surfaces of the open cavity and/or the side surfaces of the first insert strip 12 are provided or coated with a reflective material 22 in order to direct portions of the light that has been emitted in this direction in the direction of the emitting surface 25.

In order to achieve a form-fitting connection between the first insert strip 12 and the base body 11, the first insert strip 12 has protuberances 28 that engage in recesses 23.

In an analogous embodiment, the insert strip 12 could—analogously to the protuberances 23 in the base body 11—also contain protuberances in which an additional clamping element would be inserted in order to achieve a form-fitting connection between the first insert strip 12 and the base body 11.

In order to further facilitate the insertion, an additional recess 21 is provided in the rear region of the open cavity 17 that allows the base body 11 to be bent open for insertion of the first insert strip 12. Depending on the application and dimensioning of the profiled safety strip 10, one or more such recesses 21 can be provided in order to ensure easier insertion of the first insert strip 12.

FIG. 11 shows the second insert strip 31. It can be seen that the base body 11 has a dovetail-shaped groove 18 that forms the receiving region for the fastening of the second insert strip 31. For this purpose, the second insert strip 31 has a dovetail-shaped protuberance 33 that is inserted into the dovetail-shaped recess 18. The second insert strip 31 is supported and bounded on one side by the window pane 16. Opposite the window pane 16, the base body 11 has a supporting wedge 34 that prevents kinking of the second insert strip 31. That is, the second insert strip 31 is arranged between supporting wedge 34 and window pane 16 in order to be received and fixed to the base body.

The second insert strip 31 is made of at least partially transparent material, preferably silicone, and has in its front region, or in the region of the front side or in the contact region, a profile lip 36 and an air chamber 35 that are flexibly compressed upon contact with a stop or an obstacle and, in connection with the contact strip 14 in the lower contact region, thus enable the movement of the door to be stopped.

Since the entire second insert strip 31 is made of at least partially transparent and elastic material, it is possible for the light that is transmitted by the light source 32 to be emitted both in the direction in which the door closes and in the direction of the outside or inside of the door. Here again, the light sources 31 are embodied as LEDs 32 that are mounted on a flat strip 37.

The light color of the first and second insert strips 12, 31 can be preferably different. Each of the first and second insert strips 12, 31 can preferably output a plurality of colors. It is also possible for the activated colors of the LEDs 32 to be changed as a function of the movement of the door, i.e., when it is opening or closing, with a green light being preferably emitted on the inside and on the outside during opening and a preferably red light being emitted on the inside and on the outside—i.e., with the first and second insert strip—during closing.

In order to further augment attentiveness on the passengers' part, it is possible for the LEDs that are provided in the respective insert strips 12, 31 to extend upward or downward or from the middle in both directions. Similarly, periodic illumination of the LEDs is possible in order to direct attention to a moving door.

Figure 12:
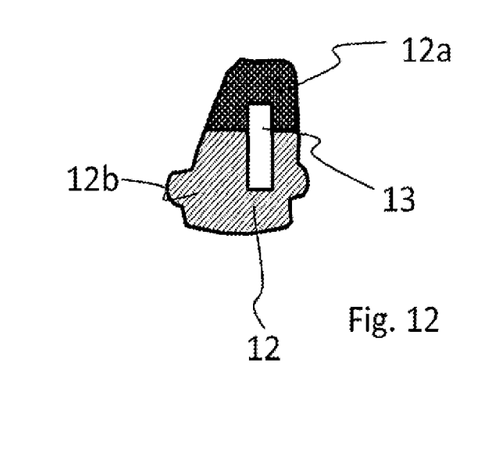
FIG. 12 shows an enlarged cutout of the first insert strip with light source according to another embodiment.
Figure 13:
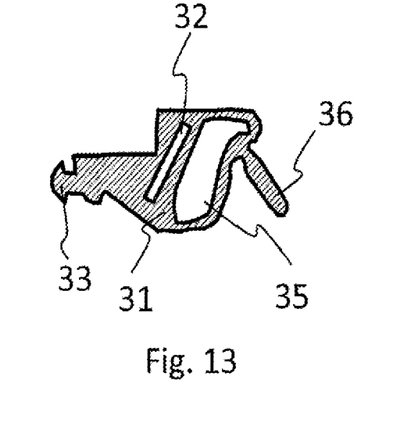
FIG. 13 shows an enlarged cutout of the second insert strip with light source according to another embodiment.

FIGS. 12 and 13 illustrate additional alternatives for the design of the insert strips. By way of example, FIG. 12 shows the first insert strip 12, which is composed of two components 12a and 12b. The rear component 12a is light-impermeable or opaque. The component 12b on the emitting surface is made of at least partially transparent material. This has the advantage, for example, that the light source 13 can be inserted into the component 12a and then sealed with the front transparent component. Such a configuration is also possible for the second insert strip 31.

By way of example, FIG. 13 shows the second insert strip 31, the light source 32 being aligned here parallel to the rear side of the air chamber. A vertical arrangement of the light source 32 relative to the window pane 16 is also possible.

It is also possible to use only one of the insert strips 12 or 31 according to the invention in a profiled safety strip 10. That is, the profiled safety strip 10 may have only the first or the second insert strip, in which case the base body is embodied as an opaque elastic body in the region of the other non-existent insert strip.

The insert strips can also be offset relative to one another in terms of installation height. For example, the first insert strip 12 could be located in the middle region of the door and the second insert strip 32 could be located either only in the upper or lower region of the door, or both below and above but not in the middle region.

The base body 11 is produced by means of an extruder, so that the open cavity 17, the profile lip 51, the chamber for the contact strip 14 and for the light grid arrangement 19, as well as the receiving region for the second insert strip 32 are produced in an extrusion process. This enables a wide variety of shapes to be realized for the base body 11. By virtue of the extrusion process, solid to viscous curable masses, preferably rubber, can be pressed out continuously under pressure from a shaping opening, whereby it is possible to produce very long profile strands.

The insert strips are also produced by means of an extrusion process. A silicone that is at least partially transparent is used as material here, for example. It is thus easy to produce the insert strip with protuberances and/or recesses. Furthermore, the passage for receiving the light source can be easily manufactured. The flat strip 37 is then simply inserted into the openings of the passage from below or above and sealed. If the length of the fully assembled profiled safety strip is excessive, it is also possible to provide the insert strip with an access slot to the passage (not shown). This access slot would then extend in the longitudinal direction of the insert strip, specifically on the rear side of the insert strip, i.e., on the side that is inserted into the cavity 17. As a result of the insertion of the insert strip into the cavity, the access slot is compressed, whereby the light source is fully enclosed by the insert strip and sealed off against external influences.

Figure 14:
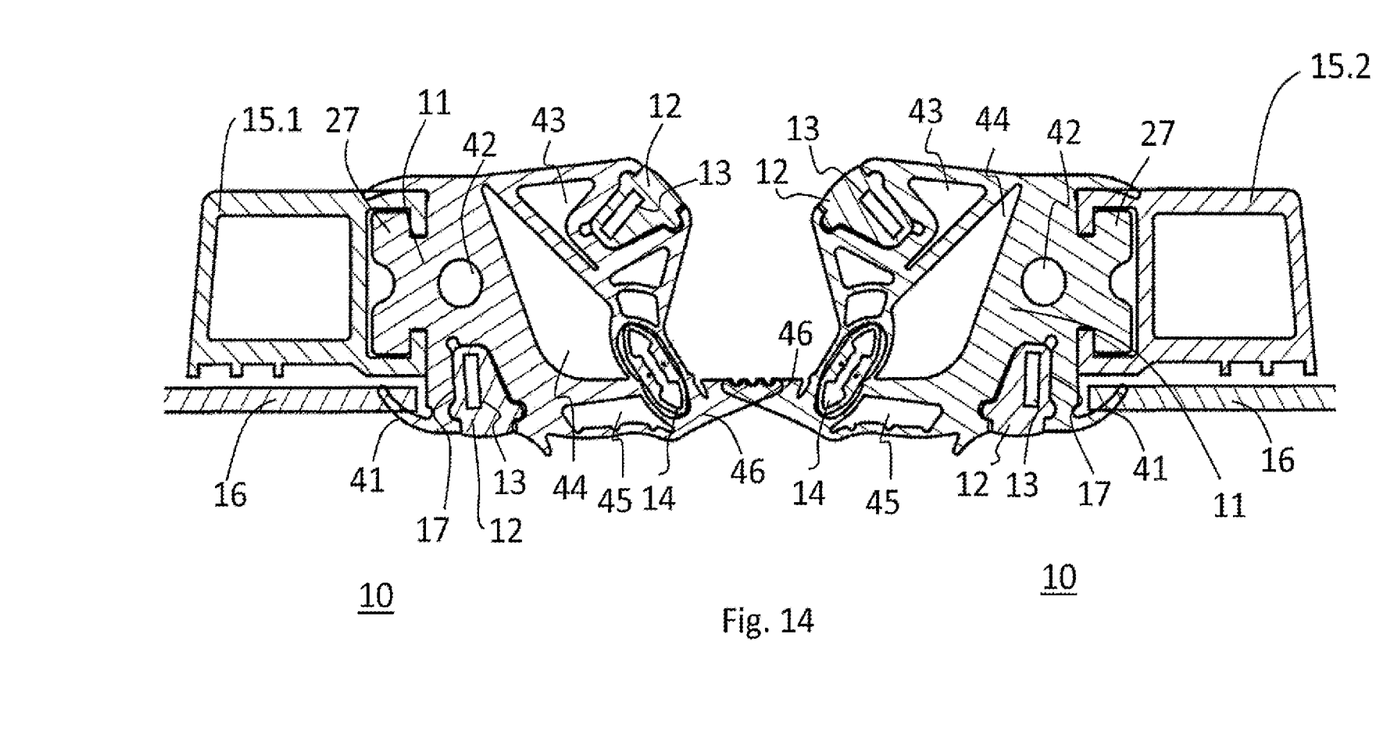
FIG. 14 shows a cross section of profiled safety strips according to the invention according to another exemplary embodiment that are integrated into a double door according to FIG. 2.

FIG. 14 shows an alternative embodiment of a profiled safety strip 10 according to the invention that is fastened to a double door analogously to FIG. 4. The two leaves of the sliding doors 15.1 and 15.2, preferably an inward- or outward-swinging door, run counter to one another during a closing movement. Not unlike the profiled safety strip 10 according to the invention in FIGS. 3a and 3b or FIG. 4, the profiled safety strips 10 illustrated in FIG. 14 each have a base body 11 that is preferably made of rubber. The profiled safety strips 10 have a plurality of air chambers 43, 44, and 45 that are compressed when the profiled safety strips 10 run against one another. A respective contact strip 14 is provided which emits an electric signal when compressed by an object in order to trigger a reversing of the doors, for example.

In addition, each of the profiled safety strips 10 according to FIG. 14 has two insert strips 12 that are configured identically, which reduces the manufacturing cost of the profiled safety strips in comparison to the profiled safety strip according to FIG. 3 or FIG. 4. However, it is also possible for the two profiled safety strips 10 to have different designs for different applications.

Moreover, sealing lips 46 are present in the contact region that lie one above the other when the double door is in the closed state. A respective circular chamber 42 is provided in the base body 11 which serves as a cable bushing and is provided the purpose for passing the power supply for the lighting means 13 into the insert strips 12. The profile foot 27 is received in a hollow profile, preferably made of aluminum, of the door leaves 15.1 and 15.2. The outside of the door—i.e., the side of the means of transport or of the building that is oriented outward in the assembled state—has a glass pane 16 that is covered by a covering lip 41 of the profiled safety strip 10 in the edge region. In this embodiment and in all embodiments, the glass pane 16 can be replaced by other coverings made of plastic or metal, for example.

It is not shown in FIG. 14 but readily conceivable for the left portion to be embodied as a fixed portion of a door portal against which the door 15 shown in the portion to the right abuts against the profiled safety strip according to the invention.

With reference to the embodiment in FIGS. 1b and 1c, it is possible for the insert strips 12 with the lighting means 13 to be configured so as to extend only partially over the entire height of the door relative to the longitudinal extension of the profiled safety strip. Since the profiled safety strip 10 is not moved with a corresponding attachment to the door portal, the insert strips 12 can be designed so as to be more extensive. In addition, as already described above, it is also easier to feed the power supply to the lighting means 13 for the profiled safety strip on the door portal.

It is not shown in the figures, but also possible, for the profiled safety strip 10 according to the invention to be arranged on a plug door, a swing door, a folding door, a swinging-sliding door, an inward-swinging door, or an outward-swinging door, etc., that runs either against a stationary door stop or against another leaf of a corresponding door.

The invention claimed is:
1. A profiled safety strip for a door of a means of transport, wherein the profiled safety strip contains an opaque elastic base body, in which at least one receiving region is formed, and
wherein a first insert strip is arranged in the at least one receiving region, wherein the first insert strip contains at least one light source and is made of an elastic material that is at least partially transparent,
wherein the profiled safety strip has an outer facing side, a front end contact region, an inner facing side and a fastening region,
wherein the outer facing side of the profiled safety strip is in contact with a windowpane of the door when being assembled to a door,
wherein the front end contact region comprises a profiled rib arranged in the front end contact region that strikes against a stop or against an oppositely situated door or the profiled safety strip thereof during closing of the door,
wherein the inner facing side is directed to an interior space of the means of transport, the at least one receiving region is arranged at and directed to the inner facing side and is arranged between the front end contact region of the profiled safety strip and the fastening region of the profiled safety strip,
wherein the profiled safety strip is fastened by its fastening region in a door profile, when being assembled to the door.

2. The profiled safety strip as set forth in claim 1, wherein a first receiving region is embodied as a cavity that is open at least to the interior side of the profiled safety strip, and wherein one or more first said insert strips made of an at least partially transparent material are inserted into the open cavity and contain the light source.

3. The profiled safety strip as set forth in claim 2, wherein a second receiving region is embodied as a form-fitting region, wherein a second insert strip is insertable or arrangeable in the form-fitting region, wherein the second insert strip has a fastening portion corresponding to the form-fitting region.

4. The profiled safety strip as set forth in claim 3, wherein the form-fitting region is embodied on a front face of the base body that faces toward another door or a stop.

5. The profiled safety strip as set forth in claim 2, wherein the open cavity has at least one recess that forms a form-fitting connection with at least one corresponding protuberance of the one or more first said insert strips.

6. The profiled safety strip as set forth in claim 2, wherein a reflective region is formed on a surface adjoining the one or more first said insert strips that deflects a light emitted by the light source away from or out of the base body.

7. The profiled safety strip as set forth in claim 1, wherein the profiled safety strip has an electrical contact strip and/or a light grid arrangement.

8. The profiled safety strip as set forth in claim 1, wherein the light source contains LEDs that emit light in one or more colors in the visible wavelength range, and/or the LEDs are arranged on an elongate flat strip that is inserted longitudinally into the open cavity, the plurality of LEDs being arranged on one or both side surfaces of the flat strip.

9. The profiled safety strip as set forth in claim 1, wherein the light source emits light of a first color when the door is being closed and light of a different color when the door is being opened.

10. The profiled safety strip as set forth in claim 1, wherein the at least partially transparent material of the insert strip forms an optical diffuser.

11. The profiled safety strip as set forth in claim 3, wherein the second insert strip contains a light source and is arranged on a side of the profiled safety strip that is situated opposite the open cavity with the first insert strip.

12. The profiled safety strip as set forth in claim 5, wherein the form-fitting connection is formed by means of a dovetail-shaped recess in the base body and a corresponding protuberance on the second insert strip or a dovetail-shaped protuberance on the base body and a corresponding recess on the second insert strip.

13. The profiled safety strip as set forth in claim 1, wherein clamping elements can be inserted between the first insert strip and an open cavity in order to fix the first insert strip in the cavity.

14. The profiled safety strip as set forth in claim 1, wherein the profiled safety strip has a contact strip, wherein the first insert strip is arranged between the contact strip and a fastening region of the profiled safety strip on the door and/or outside a flexible contact region of the profiled safety strip.

15. The profiled safety strip as set forth in claim 3, wherein the base body has a support wedge that supports the second insert strip from an inner side of the profiled safety strip in order to prevent kinking of the second insert strip.

16. The profiled safety strip as set forth in claim 3, wherein the second insert strip emits light in a direction of a front face of the profiled safety strip and to an outer side of the door.

17. The profiled safety strip as set forth in claim 3, wherein the first and/or second insert strip has an opaque and an at least partially transparent portion.

18. The profiled safety strip as set forth in claim 3, wherein the first and second insert strips have the same shape or different shapes or contours.

19. A door with the profiled safety strip as set forth in claim 1, wherein the profiled safety strip is arranged in a movable door leaf and/or a door portal.

20. The profiled safety strip as set forth in claim 14, wherein the contact strip is an electrical contact strip.

* * * * *